INVENTORS
R. R. KREISEL
C. F. MATTKE
R. E. PRESCOTT
BY E J Olvider
ATTORNEY

July 22, 1969 R. R. KREISEL ET AL 3,457,376

TELEPHONE HEADSET

Filed Nov. 18, 1965 3 Sheets-Sheet 3

United States Patent Office 3,457,376
Patented July 22, 1969

3,457,376
TELEPHONE HEADSET

Ralph R. Kreisel, Freehold, Charles F. Mattke, Fanwood, and Robert E. Prescott, Rumson, N.J., assignors to Bell Telephone Laboratories, Incorporated, New York, N.Y., a corporation of New York Filed Nov. 18, 1965, Ser. No. 508,495
Int. Cl. H04m 1/05
U.S. Cl. 179—156 4 Claims

ABSTRACT OF THE DISCLOSURE

An on-ear telephone headset is distinguished by several adjustment features enabling it to fit almost any head geometry with equal comfort. The headband is in two frictionally coupled pieces. The headset housing is a compact unit consisting predominately of the receiver earpiece. A yoke which suspends the housing can be backed away from the wearer's ear. Telescoping acoustic speech tubes provide jowl clearance. Two fully pivotable padded pressure members contact the wearer's head.

This invention relates to transmitter-receiver units of the type supported in use upon the head of the user. Specifically, the invention relates to telephone operator headsets.

Although significant improvements have been made recently in the performance and wearing comfort of telephone operator headsets, certain features remain of concern. Still a chief cause of wearer discomfort is the uneven distribution of weight upon the operator's head. Frequently the pressures of the supporting headband add to the discomfort. One solution to this general problem, proposed in the application 506,310 of H. W. Bryant-N. C. Hazell-L. W. Mosing filed Nov. 4, 1965, and assigned to applicants' assignee, involves eliminating altogether the headband and the conventional heavy magnetic core transducers and employing instead lightweight variable reluctance transducers in a housing completely supported and suspended from the wearer's ear.

Many operators, however, prefer headsets with the conventional receiver pieces worn next to the ear, whether out of habit or for their acoustic characteristics, despite their greater weight and attendant wearing discomforts. It is accordingly important to alleviate wherever possible these discomforts.

Part of the weight distribution problem stems from the relative inflexibility of current headbands, which lack certain critical adjustment mechanisms to provide for the great variety of head geometry and individual wearing preferences found among telephone operators. For example, preferences as to headband pressures vary considerably. Additionally, preferences as to receiver-to-ear pressures vary not only from operator to operator but also from time to time in the same operator. Moreover, operator work often requires withdawing the earpiece from the ear, which entails removing the headset altogether or at least shifting its location on the operator's head. Since these movements usually disturb the operator's hairdress, it is understandable that operators become dissatisfied and frustrated with such headsets.

Of concern also is that prior art headsets in general have been unable to achieve both high acoustic performance and a comfortable fit for the operator.

Accordingly, a general object of the invention is to reduce in degree and number the discomforts incident to wearing of a telephone headset.

Another object of the invention is to eliminate as a cause of discomfort the weight and pressure distribution problems in a telephone operator's headset.

A further object of the invention is to enlarge upon and improve the critical adjustments in the headband support to enable adjustment thereof to the preference of any operator.

A further object of the invention is to enhance the positionability of the several elements in a typical operator's headset.

These and other objects are accomplished in accordance with the invention in a telephone headset, broadly, by improved supportive means including a headband of both variable length and variable tension, and a pair of pivoted pressure pads mounted thereon, one of which includes an adjustable pivotable support for the receiver housing to move the receiver toward and away from the ear.

In one embodiment of the invention, the receiver and transmitter are both mounted in a housing supported between a pair of gimbals on a yoke. The yoke is swivelably mounted upon an arm suspended from one of the pressure pads. The arm in turn is pivotally mounted in the pressure pad housing to swing toward and away from the user's head. This motion may be controlled or set by the operator through a knob adjustment upon the front of the pressure pad housing. It also allows the operator to vary the pressure of the receiver cap against the ear or to back the receiver cap completely away from the ear.

In accordance with another aspect of the invention, the headband comprises two curved strips of stiff, springy material such as spring steel, each mounted in an adjustable coupling joint. One of the pieces, for example, the headband piece remote from the receiver, slides through the coupling for its entire length, between an inner surface thereof and a spring segment of the other headband piece. This adjustment is easy to make, retains well and is inexpensive to produce.

Pursuant to a further aspect of the invention, an acoustic speech tube mounted in a ball-joint within the housing is adjustable longitudinally, rotatively and swivelably so as to permit the end thereof to be positioned in any location with respect to the wearer's mouth, once the headset proper is comfortably seated.

Accordingly, a feature of the invention relates to a two-piece headband in which the pieces apply their own compliance to a common connecting link to maintain an adjustment.

Another feature of the invention involves swivelable pressure pads at the ends of the headband pieces, which conform automatically to head geometry and distribute headset weight evenly over a wide area.

A further feature of the invention resides in a pivotable supporting for the headset receiver housing that permits adjusting the receiver cap away from the ear without need for removing the headset.

A still further feature of the invention relates to a two-piece acoustic pick-up tube with rotative, translative and swivel adjustments which enable the tube to be adjusted precisely to the wearer's mouth once the housing is positioned.

These and other objects and features of the invention are described in detail in the delineation to follow of an illustrative embodiment, and in the drawing in which.

Figures 1A, 1B, 3A, 4, 5A:
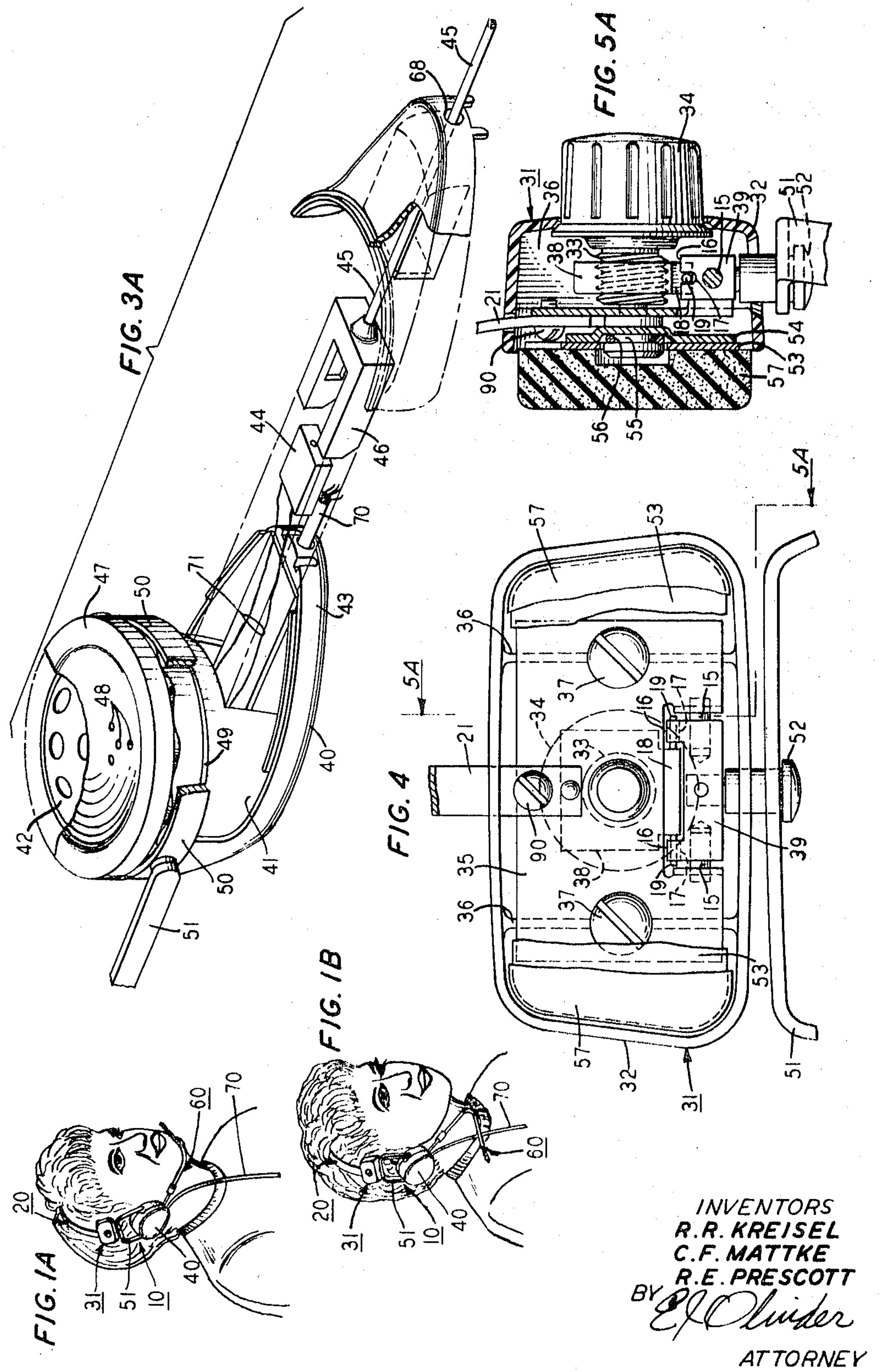
FIGS. 1A and 1B are perspective views of the operator's headset in place.
FIG. 3A is a partially expanded perspective of the headset housing.
FIG. 4 is a front view in partial cutaway showing a means for adjusting the receiver earcap with respect to the ear.
FIG. 5A is a side view in partial section of the receiver adjustment and the adjacent pressure pad.

In FIG. 1A, the telephone headset designated generally as 10, is shown mounted in position upon the head of an operator. Headset 10 comprises a headband 20, with a pair of oppositely disposed pressure members 30, 31, a housing 40, an acoustic tube 60, a cord 70 and support means suspending housing 40 from one of the pressure members, for example, member 31.

As shown in FIG. 3A, housing 40 comprises a hollow cup portion 41, in which a conventional receiver 42 advantageously of the central armature type is mounted, and an extension portion 43 in which a small transmitter 44 and an inner end of a rigid acoustic tube 45 are adjacently supported in a compliant element 46. A plastic cap 47 with perforations 48 adjacent the diaphragm of receiver 42 is threaded to a flange 49 of housing 40, and as shown in FIG. 1B, rests next to the operator's ear when in position. Flange 49 and the outer periphery of cap 47 form an annular groove or recess in which a ring 50 is slidably disposed.

Figure 2:
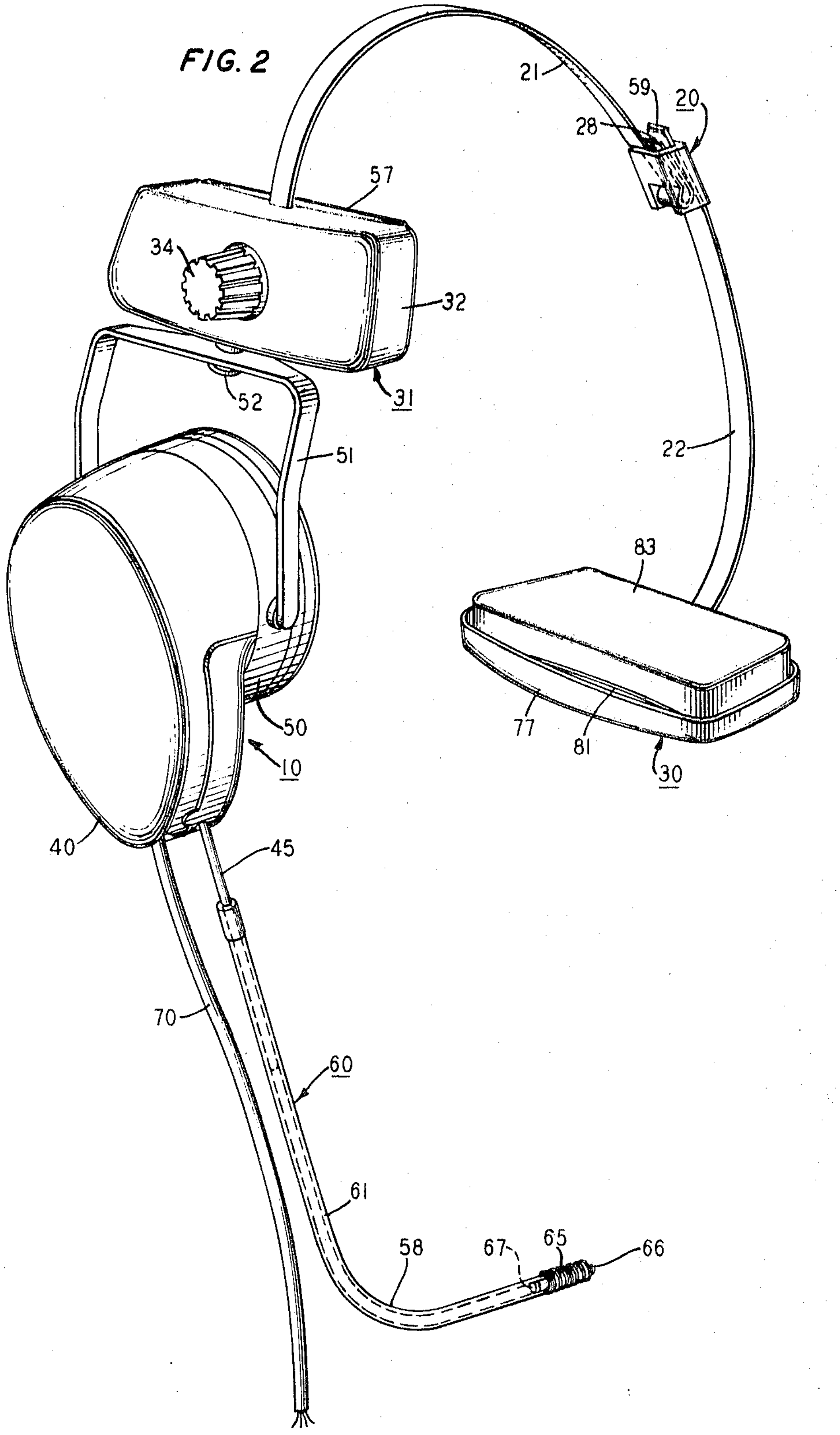
FIG. 2 is an enlarged perspective view of the headset.

As seen in FIG. 2, ring 50 is pivotably connected at two diametrically opposed points to a yoke 51 which in turn is swivelably supported upon a pin 52. Pursuant to one aspect of the invention, pin 52 is manually adjustable within the housing 32 of pressure member 31, which enables yoke 51, or some equivalent supportive structure, to be swung through a substantial arc, thereby to vary the position of yoke 51 with respect to the fixed housing 32. One mechanism for achieving this is shown in FIGS. 4 and 5A.

As shown therein, a screw 33 including a knob 34 is mounted for rotational, but not translational, movement within a plate 35 held to a pair of flanges 36 by screws 37. Inwardly of plate 35 on screw 33 there is threaded a block 38 which translates between plate 35 and knob 34. Plate 35 also supports a pivot bar 39 upon a pair of opposed pivots 15 disposed beneath block 38. Bar 39 includes a pair of upwardly extending legs 16 each with a longitudinal groove 17. Between legs 16 is disposed an extension 18 of block 38, with a rod 19 affixed thereon which engages the grooves 17. Movement of screw 33 causes translation of block 38 and its extension arm 18, which in turn causes rod 19 to move legs 16. Pivot bar 39 thereby pivots on its axis. Pin 52, which is fixedly mounted to pivot bar 39, and led through an opening in housing 32 pivots a magnified amount causing yoke 51 to pivot substantially. The pivotal movement is in a plane perpendicular to the adjacent head surface of the wearer. By turning knobs 34, the wearer can readily adjust the force of contact of receiver cap 47 upon the ear, or if desired, can back the entire housing substantially away from the head, as shown in FIG. 1B.

Figure 5B:
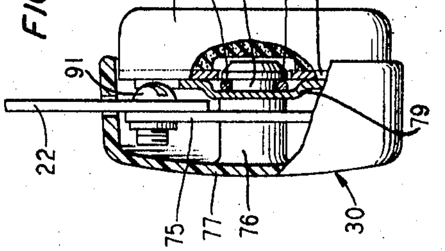
FIG. 5B is a side view in partial section showing the opposite pressure pad mounting.

Headband 20 is fastened to the pressure members at suitable points as, for example, upon plate 35 of member 31 with screw 90 (FIG. 4) and upon plate 75 of member 30 with screw 91 (FIG. 5B).

Pursuant to another aspect of the invention, each pressure member swivelably supports a soft pressure pad of vinyl, for example. This is accomplished in pressure member 31 with a rigid plate 53 with a mounting flange 54 having a central circular bearing surface. This surface rides in an annulus 55 in the far end of screw 33, loosely retained there by a bushing 56. A resilient pad 57 is adhered to the outer surface of plate 53, as shown in FIG. 5A. For pressure member 30, which does not contain an adjustment feature such as described for pressure member 31, the arrangement is nevertheless similar.

As shown in FIG. 5B, a plate 75 is rigidly mounted to a shaft 76 that may be molded integrally with housing 77 of member 30. Shaft 76 has an annular groove 78 near its outer end in which a mounting plate 79 is retained in a loose fit by a bushing 80. A plate 81 fastened to the outer side of mounting plate 79 includes a bearing surface 82 that rides in a loose fit on the outer edge of shaft 76. Plate 81 supports a pressure pad 83 with a suitable adhesive. Due to their loose mounting, plates 53 and 81 swivel upon their mountings to allow pads 57 and 83 to assume a variety of positions with respect to their housings, to conform to the wearer's head contours on the points of contact.

Figures 6A, 6B, 6C:
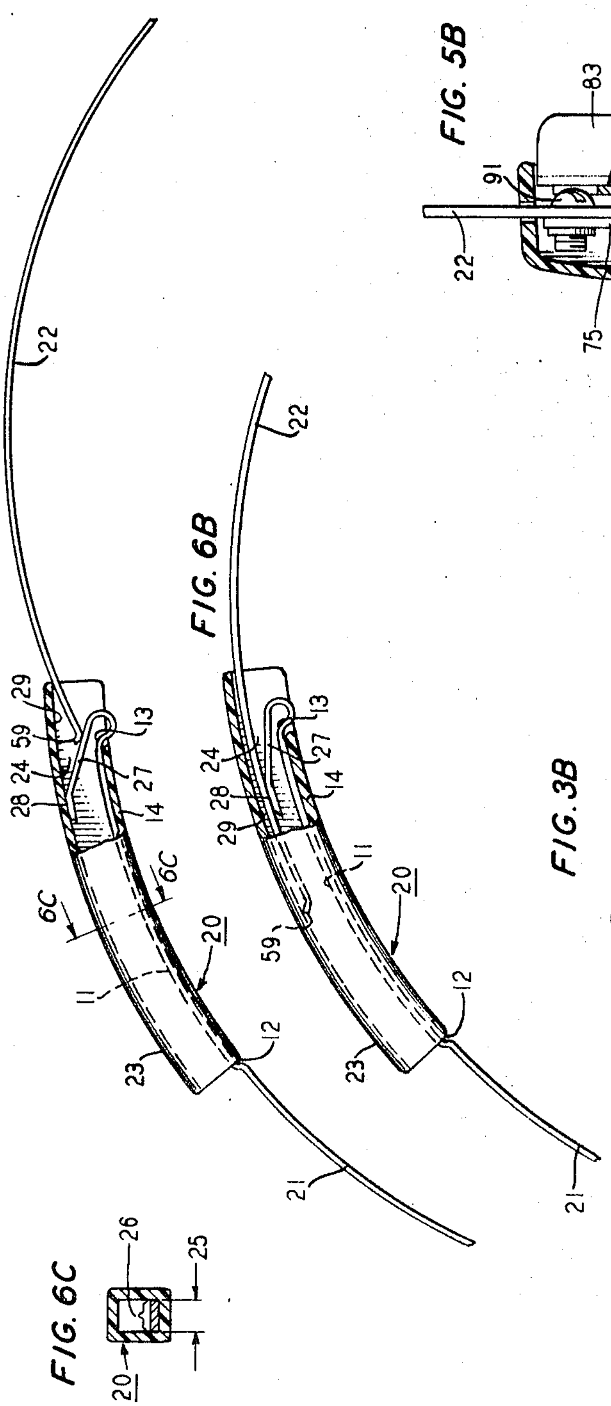
FIGS. 6A, 6B and 6C are front and side views in partial cutaway of the headband support.

In accordance with a further aspect of the invention, the headband 20 is produced with two curved sections of a springy material such as stainless steel strip, held in a desired adjustment by their own compliance applied to a single coupling. FIG. 6A shows headband 20 comprising a left strip 21, a right strip 22 and a coupling 23 with an inner volume 24 defining an elongated passage of rectangular cross section. The width 25 (FIG. 6C) of this passage is slightly greater than the width of strips 21 and 22 as, for example, width 26 of strip 21. The mating end 27 of strip 21 is doubled back so that surface 28 of end 27 and the upper surface 29 of the inner volume 24 meet at a sharp acute angle and contact with a substantial frictional force produced by the spring tension in end 27.

A portion 11 of strip 21, lying adjacent end 27 and shown in FIG. 6A, is offset to produce two ridges 12, 13 upon strip 21. Portion 11 is of substantially the same length as lower surface 14 of inner volume 24, so that when portion 11 and surface 14 are aligned, ridges 12, 13 are forced down in a seat adjacent the ends of surface 14. This retains strip 21 in a tight, friction fit on coupling 23.

As shown in FIG. 6B, strip 22 is curved similarly to strip 21 and includes advantageously a small lip 59 at its mating end. Coupling is effected by placing strip 21 in position as shown in FIG. 6A, and by inserting strip 22 into the wedge-shaped space defined between end 27 and surface 29. As strip 22 passes over surface 28, end 27 further compresses and presses strip 22 against upper surface 29. Strip 22 can be passed well into coupling 23, as shown in FIG. 6B, or can be passed completely through it to achieve a wide range of adjustments. One such adjustment is shown in FIG. 2, which places pressure members 30, 31 relatively far apart.

Further advantages of this aspect of the invention are that the headband is very inexpensive, disassembles readily for easy storage, is extremely light and detracts little from the operator's appearance.

As shown in FIG. 3A, a miniature transmitter 44, advantageously of the variable reluctance balanced armature type commonly employed in hearing aids, is retained in compliant element 46. A pair of leads 71 connect transmitter 44 to receiver 42 within housing 40. Other connections (not shown) are effected in routine fashion with conductor pairs included in cord 70.

Figure 3B:
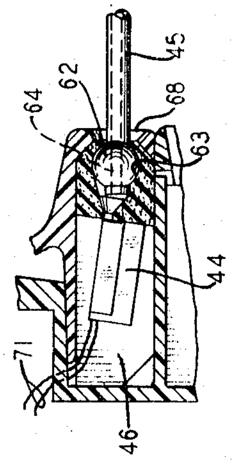
FIG. 3B is a sectional side view of an acoustic tube mounting.

Pursuant to a further aspect of the invention, a highly efficient and adjustable acoustic pick-up tube system is employed to drive transmitter 44. This acoustic tube system, designated as 60, is substantially the same as that employed wih the telephone headset described in the cited copending H. W. Bryant-N. C. Hazell-L. W. Mosing application, and comprises a rigid lightweight tube 45 of stainless steel and a plastic tube 61 slidably mounted thereon. Tube 61 advantageously is fabricated of cellulose acetate and comprises a straight section that rides on tube 45 followed by a curved section 58 near the wearer's mouth. Tube 45 terminates in an acoustic ball-joint 62, shown in FIG. 3B, which is made of a suitable lightweight material and provides a swivel mounting for tube 45. Ball-joint 62 is retained in a slight interference fit in a generally spherical chamber 63 with element 46. Ball-joint 62 includes a passage 64 that acoustically connects tube 45 to transmitter 44. The angular displacement of tube 45 is constrained by the diameter of the exit opening 68 through which tube 45 passes. Acoustic passage 64 in ball-joint 62 is flared at its end adjacent transmitter 44, so that when tube 45 is deflected fully against opening 68 no restriction of the acoustic path occurs. This construction allows tubes 45 and 61 to be adjusted with respect to the wearer's mouth, without disturbing the position of headset housing 40.

Tube 61 rotates and telescopes upon tube 45 in a light friction fit therewith. This adjustment is stable and, in conjunction with the curved portion of tube 61, allows for both men and women users a full scope of adjustments for any ear-to-mouth geometry.

In accordance with another facet of the inventive concept, a screen 65 fits over the open end of tube 61, as shown in FIG. 3. Screen 65 is an elongated coil spring with openly spaced turns and a coned-in helical end 66. Advantageously, screen 65 is made of steel music wire coated with a hard, smooth plastic. This screen serves to reduce the sidetone effects of certain operator speech sounds especially "b" and "p." These effects occasionally are produced when the end of tube 61 is placed too close to the mouth and at high levels can cause an unpleasant acoustic transient heard by both the operator and customer. By causing a turbulence in the speech air stream, the forward velocity of the operator's speech waves is reduced and some of their energy dissipated. Forward velocity is further reduced by a sintered steel insert such as disc 67, placed just inwardly of screen 65. Disc 67 also aids in reducing high frequency response peaks in the tube-transmitter combination.

One illustrative embodiment of the inventive concept has been shown and described. It is to be expressly understood that various changes and modifications may be made therein without departing from the spirit and scope of the invention.

What is claimed is:

1. A telephone headset comprising:
a housing comprising a receiver earcap mounted thereon, a transmitter and a receiver mounted therein, a circular recess in the housing surface behind said earcap and a ring slidably engaged in said recess for unlimited rotation therein;
a headband comprising first and second curved resilient strips and an elongated coupling including a passage for frictionally and slidably receiving said strips;
means comprising a yoke rotatable with respect to an end of one of said strips and with its arms pivotally connected to said ring, for adjustably positioning said receiver earcap adjacent to the wearer's ear; and an acoustic speech tube comprising first and second telescoping scetions, and means for swivably mounting said tube in said housing adjacent said transmitter.

2. A telephone headset in accordance with claim 1, wherein said adjustable positioning means further comprises a pressure pad member connected to said strip end a pin mounted in said member for pivotal movement toward and away from the user's head, said yoke being rotatably connected to the end of said member, and means for adjustably positioning said pin within its ambit of pivotal movement.

3. A telephone headset in accordance with claim 1, further comprising a resilient acoustic enclosure for mounting said transmitter and including said speech tube swivel mount, said enclosure acoustically isolating said transmitter and said speech tube from the remainder of the headset.

4. A telephone headset comprising:
a housing comprising,
a cylindrical shaped cup section with a receiver mounted therein and an earcap for retaining said receiver,
an oval-shaped extension portion beneath said cup section with a compliant element mounted therein,
a circular recess in the surface of said cup section beneath said earcap and a ring slidably engaged in said recess for unlimited rotation therein, and
a transmitter mounted in a first portion of said compliant element;
a headband comprising first and second resilient strips and an elongated coupling including a passage for frictionally and slidably receiving said strips;
means comprising a yoke rotatable with respect to an end of one of said strips and having its arms pivotally connected to said ring for adjustably positioning said earcap adjacent to the wearer's ear; and
an acoustic speech tube comprising an inner section swivably mounted in a second portion of said compliant element, and an outer section mounted in telescope fashion onto said inner section.

References Cited

UNITED STATES PATENTS

| | | | |
|---|---|---|---|
| 2,486,267 | 10/1949 | Dulinsky | 179—156 |
| 2,843,680 | 7/1958 | Pollard | 179—156 |
| 3,258,533 | 6/1966 | Bredon | 179—156 |
| 1,546,566 | 7/1925 | Childress | 179—156 |
| 3,184,556 | 5/1965 | Larkin | 179—188 |
| 3,280,273 | 10/1966 | Flagstad et al. | 179—156 |

FOREIGN PATENTS 770,257 3/1957 Great Britain.

KATHLEEN H. CLAFFY, Primary Examiner

J. S. BLACK, Assistant Examiner

U.S. Cl. X.R.

179—182